A. JONES.
Cotton Gin.
No. 2,731. Patented July 20, 1842.
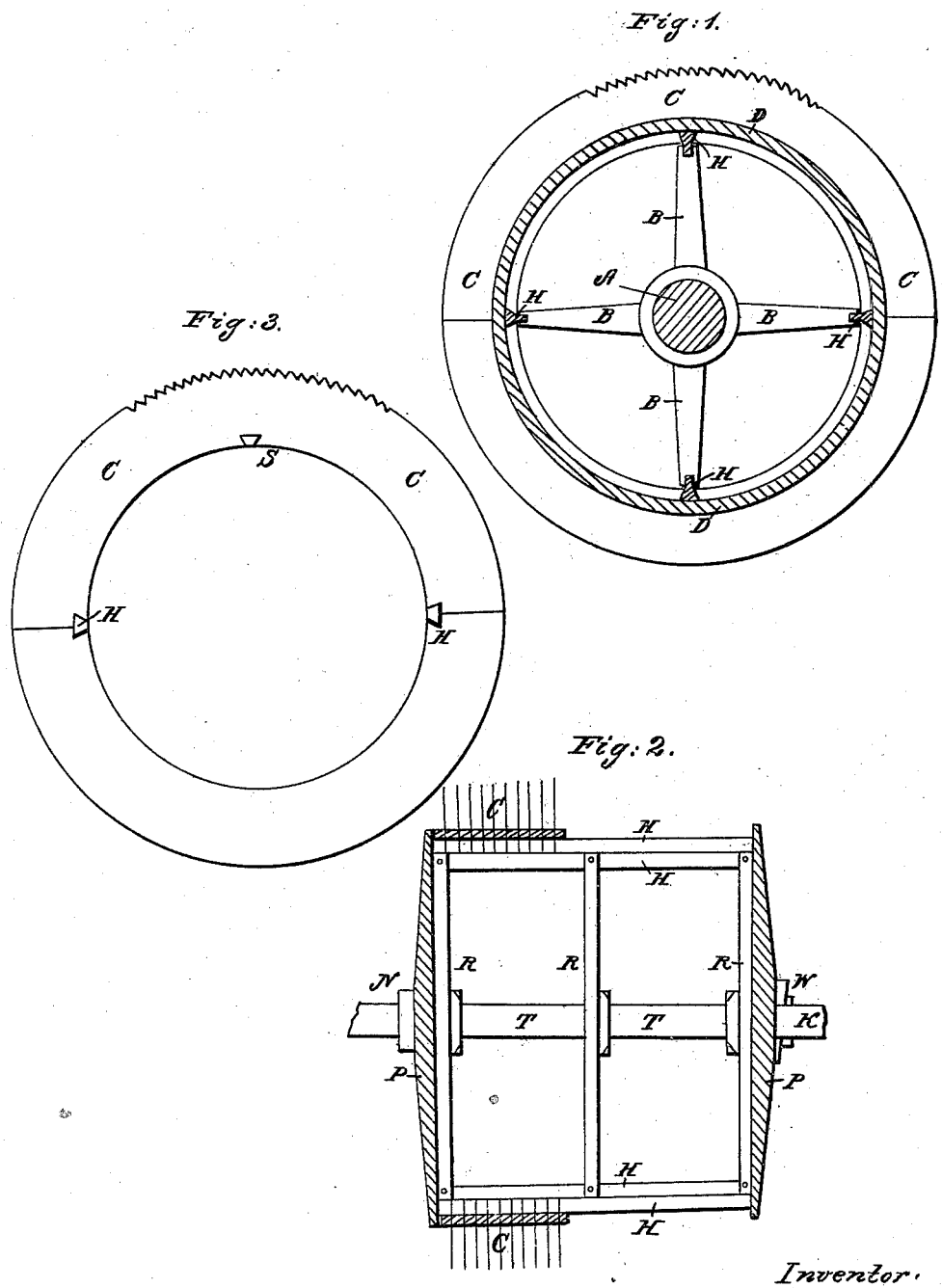
Inventor:
Alex Jones.

UNITED STATES PATENT OFFICE.

ALEXR. JONES, OF NEW YORK, N. Y.

IMPROVEMENT IN THE MANNER OF CONSTRUCTING SAW-CYLINDERS FOR COTTON-GINS.

Specification forming part of Letters Patent No. 2,731, dated July 20, 1842.

*To all whom it may concern:*

Be it known that I, ALEXANDER JONES, of the city and county of New York, and State of New York, have invented a new and improved mode of constructing the saw-cylinders for cotton-gins of metal, and at the same time so arranged as to have the saws well secured in their position on a new plan, and by means of which the cylinder is made light, having in its interior a much larger hollow space than has heretofore existed, by forming the cylinder on any of the ordinary plans hitherto in use, of which the following is a specification.

The method of constructing this cylinder heretofore in use has either been to use wooden blocks to separate the saws, which were cut in solid sheets with a center hole for axle or shaft, or the saws were cut in semicircles with holes punched in them, and were inserted and nailed in grooves cut in circles around cylinders of wood fixed on the saw spindle or axle. In this last form they were usually built by Carver and others. In the other instance the saw-cylinder has been made all of metal, in which case the saws were cut in solid sheets, with holes just large enough in their centers to admit the shaft or axle. These saws were kept apart by means of metallic wheels, with arms reaching from the periphery of the circle to a square center, through which the saw-shaft passed. This mode of construction was employed by Wm. Idler, of Philadelphia. The objections found among cotton-growers to all these modes of construction were as follows:

First. It was found when wood in any form was used as a material of separation between the saws that the changes of weather had a serious effect upon its substances, so as to alter its dimensions, and when it became too dry the wood would shrink and leave the saws more or less loose, and, on the contrary, when very wet or damp the wood would expand. By means of either of these circumstances the saws were liable to be displaced from their true position, so as not to run in a true line in the small space allowed for their passage between the grates, through which they must pass to strip the fibers of cotton from the seed.

Second. When made all of metal on the plan proposed by Wm. Idler, they were found to be too heavy and to require too much power to propel them. Besides, the mode of construction made them expensive.

It has never been doubted but metallic cylinders were best, provided they could be made on a plan both cheap, simple, light, and strong. These latter desiderata I have endeavored to fulfill by constructing the cylinder on a new plan, as follows:

I use longitudinal rails or flanges H H, Figures 1 and 2, (see drawings,) on which the saws C C, Figs. 1 and 2, are cut to fit. These rails H H are inserted into square notches in the ends of spider-arms B B, (see Fig. 1,) and at H H, (this Fig. 1 showing cross-section of cylinder.) Two or more of these spider-arms may be used to hold the rails according to the length of the cylinder, and each spider may have three or four arms. The rails H H are so formed that they project about an inch beyond the ends of the spider-arms, which projection is beveled in the form of a dovetail.

C C represent the semicircular saws, with beveled or dovetail-formed notches cut in them to fit the bevel form of the rails, and which are slid in their places from one end of the cylinder toward the other. Having a plain simple metallic or zinc ring, D D, with no arms or projections slid on over the rails H H alternately between the saws, to keep them apart, the whole are pushed forward till they rest against a flange, P, Fig. 2, which itself rests against a nut, N, at the same end. When all have been thus put on the rails, the second flange P is slid on the axle or spindle and secured firmly against the saws and rings by means of the key K and wedge W, Fig. 2; or the saws may be cut in a continuous circle without bevel-notches and slid over the rails, which may also be without bevels, having simply square surfaces, and the same metallic rings as seen at D D in Figs. 1 and 2 may be used, as in the first instance, to keep them apart, and when all are on and pressed against the flange and nut at one end of the cylinder the other flange P P may be forced up against them by means of the key K and wedge W, to secure them in place, which pressure would be found amply sufficient to prevent the saws from turning in their places when in use. As, however, it is found more economical to cut the saws from steel in semicircles, I have, in the annexed drawings, shown how to make them perfectly secure in their places in the cylinder, by cutting the beveled or dovetailed notches in them to fit the rails H H, formed in a similar manner to receive them.

The other parts of my drawings and mode of construction are easily understood from what has been said.

The center hole in the spider A, Fig. 1, is for the passage of the axle or shaft T T.

C C in Figs. 1 and 2 refer to the saws. D D refer to the zinc or metallic rings.

Fig. 3, C C show the manner in which the semicircular saws must be cut for their adjustment on the rails.

The same letters in the different figures refer to same parts of the cylinder.

What I claim as my invention, and desire to secure by Letters Patent, is—

The before-described mode of mounting the saws on the bars attached to the arms of the spiders, by having the saws notched and fitted on the said bars, instead of fitting them on a shaft or cylinder, both of which are objectionable, for the reasons stated.

ALEXANDER JONES.

Witnesses:
B. K. MORSELL,
WM. WALLIS.